United States Patent
Hung et al.

(10) Patent No.: US 7,967,444 B2
(45) Date of Patent: Jun. 28, 2011

(54) MULTI-RESOLUTION DIGITAL TABLE DISPLAY SYSTEM WITH PROJECTION DEVICE

(75) Inventors: Yi-Ping Hung, Taipei (TW); Li-Wei Chan, Taipei (TW); Yi-Wei Chia, Taipei (TW)

(73) Assignee: National Taiwan University, Taipei (TW)

( * ) Notice: Subject to any disclaimer, the term of this patent is extended or adjusted under 35 U.S.C. 154(b) by 489 days.

(21) Appl. No.: 12/111,910

(22) Filed: Apr. 29, 2008

(65) Prior Publication Data

US 2008/0316434 A1 Dec. 25, 2008

(30) Foreign Application Priority Data

Jun. 21, 2007 (TW) .............................. 96122253 A

(51) Int. Cl.
  G03B 21/26 (2006.01)
  G03B 21/14 (2006.01)
  H01L 27/00 (2006.01)
  G01J 5/00 (2006.01)
(52) U.S. Cl. ....... 353/30; 353/79; 250/208.1; 250/338.1
(58) Field of Classification Search .................... 353/37, 353/30, 31, 42, 119, 98, 79, 80; 345/156, 345/158, 173, 175, 179, 180; 348/164; 250/208.1, 250/239, 227.13, 330, 332, 334, 336.1, 338.1
See application file for complete search history.

(56) References Cited

U.S. PATENT DOCUMENTS

| | | | |
|---|---|---|---|
| 6,478,432 B1 * | 11/2002 | Dyner | 359/858 |
| 7,692,639 B2 * | 4/2010 | Silverstein et al. | 345/179 |
| 2005/0195373 A1 * | 9/2005 | Feigel et al. | 353/94 |
| 2006/0289760 A1 * | 12/2006 | Bathiche | 250/332 |
| 2008/0284733 A1 * | 11/2008 | Hill et al. | 345/163 |

OTHER PUBLICATIONS

Chan, et al., i-m-Top: An Interactive Multi-Resolution Tabletop Display System, Journal, 2007, p. 11, ICME.
Ashdown, et al., The Escritoire: A Personal Projected Display for Interacting with Documents, Jun. 2002, No. 538, University of Cambridge Computer Laboratory Technical Report.

* cited by examiner

*Primary Examiner* — Que T Le
*Assistant Examiner* — Pascal M Bui-Pho
(74) *Attorney, Agent, or Firm* — WPAT, P.C.; Anthony King

(57) ABSTRACT

A multi-resolution digital table display system is provided for integrally displaying an image picture with more than one resolution. The multi-resolution digital table display system includes a table, a peripheral projection device, a foveal projection device, and an image module. For saving space and avoiding affection of user's hand, the peripheral projection device and the foveal projection device required for projecting images are disposed under the table. The image module provides a peripheral image with a first resolution to the peripheral projection device for projecting the same to a projection screen, and provides a foveal image with a second resolution to the foveal projection device for projecting the same to the projecting screen, such that an image picture can be integrally displayed on the projecting screen.

3 Claims, 5 Drawing Sheets

MULTI-RESOLUTION DIGITAL TABLE DISPLAY SYSTEM WITH PROJECTION DEVICE

BACKGROUND OF THE INVENTION

1. Field of the Invention

The present invention relates generally to a digital table display system, and in particular, to a multi-resolution digital table display system.

2. The Prior Arts

Digital tables, capable of dealing with documentary jobs and displaying digital images, are considered a solution for restricted working space, and attract more attention for future development. Mark Ashdown published a thesis in 2002, titled "The Escritoire: A personal Projected Display for Interacting with Documents". Mark proposed in the thesis to project a digital document onto a digital table by a projection device and a reflective mirror. The whole system disclosed in the thesis was specifically designed in consideration of the special structure of human vision systems. Human visions can be divided into two kinds, which are known as foveal vision and peripheral vision respectively. The foveal vision is also known as direct vision, which is suitable for identifying details of images or color information and not suitable for identifying shadows. On the contrary, the peripheral vision is responsible for identifying shadows. In this manner, if one stares at an object for a long time, his peripheral vision gradually works less. For example, when one among a plurality of words of a letter is being stared at with more and more concentration, the other words would be more and more blurred.

According to the special structure of human vision systems, the conventional digital table employs two projection devices. One projection device is responsible for those relatively large range and comparatively blurred projection images, i.e., of a lower resolution. Another one is responsible for those small range and clear projection images, i.e., of a higher resolution.

For convenience of operation, such as moving a digital document, the digital table provides two pens respectively for two different detection systems. This requires the two detection systems won't be interfered one by another. As such, as taught thereby, one pen is a supersonic pen for moving digital documents, and the other one is an electromagnetic pen for writing on the documents.

However, according to the conventional digital table, the projection sources are all disposed above and in front of the table, and thus demanding too much space for operation and installment of the whole system. Meanwhile, in operation with such projection sources, displayed images are often sheltered by a hand or an arm of the user. When a part of an image is projected on the hand or the arm, viewers are very likely to feel uncomfortable about that. Furthermore, according to the conventional digital table, the projection position corresponding to the high resolution is fixed. However users often hope to view images with a high resolution at other areas of the digital table, and unfortunately this is not feasible according to the conventional digital table.

SUMMARY OF THE INVENTION

A primary objective of the present invention is to provide a multi-resolution digital table display system. The multi-resolution digital table display system includes a peripheral projection device and a foveal projection device for projecting images. The two projection devices are disposed under a table so that the whole system is compact and space saving. The peripheral projection device and the foveal projection device project images beneath the table, so that the image does not be sheltered by a user's hand or arm.

According to the foregoing objective, the multi-resolution digital table display system employs the peripheral projection device and the foveal projection device for integrally displaying an image picture with multi-resolution. An image module provides a peripheral image with a first resolution to the peripheral projection device for projecting the same to a projection screen, and provides a foveal image with a second resolution to the foveal projection device for projecting the same to the projection screen, such that an image picture is integrally displayed on the projection screen.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
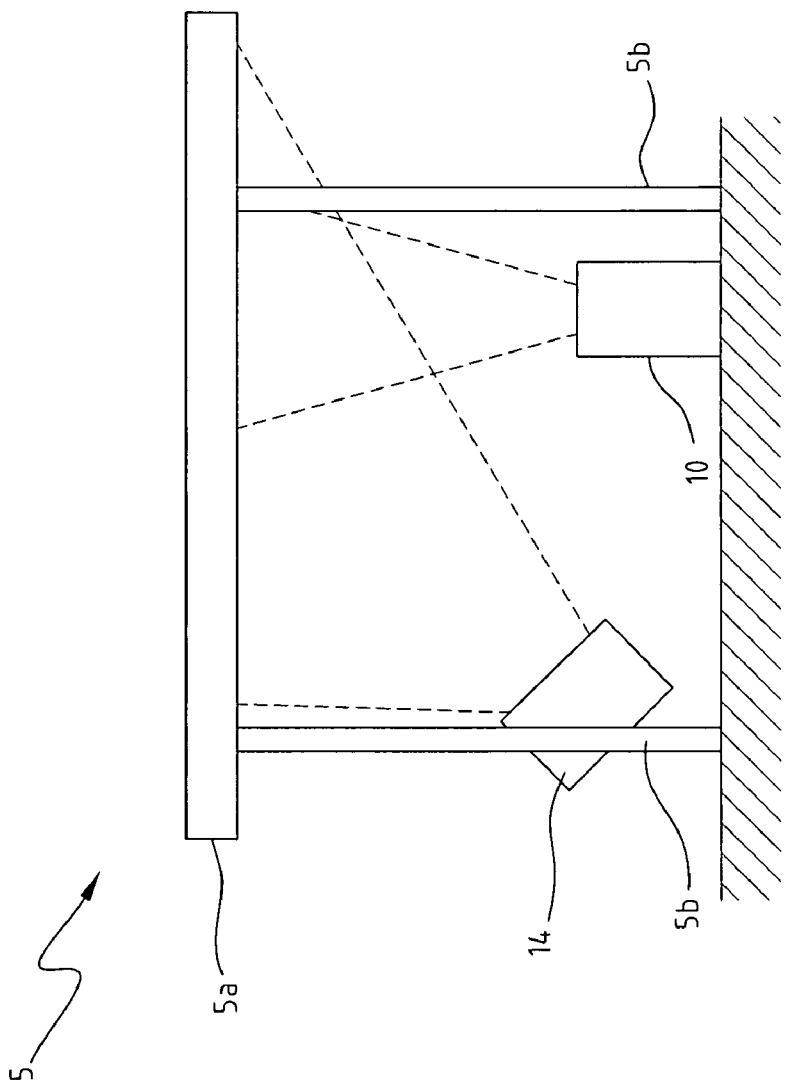
FIG. 1 is a schematic diagram illustrating a multi-resolution digital table display system in accordance with an embodiment of the present invention.
Figure 2:
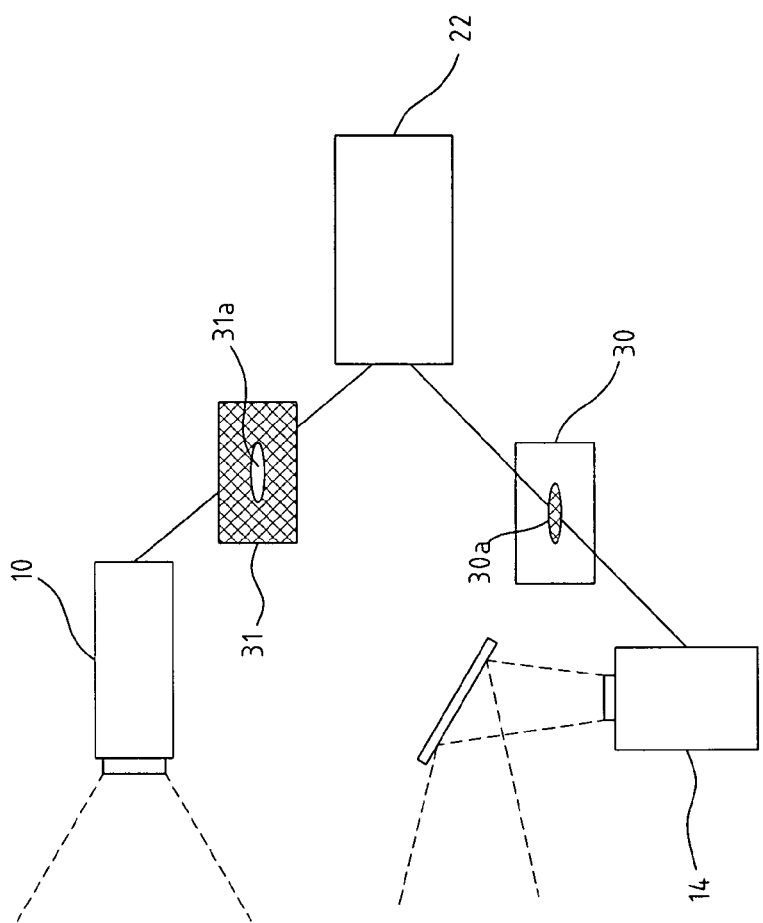
FIG. 2 is a schematic diagram illustrating a stitching of a peripheral image and a foveal image to obtain a multi-resolution image in accordance with the present invention.

Referring to FIG. 1, there is shown a schematic diagram illustrating a multi-resolution digital table display system in accordance with an embodiment of the present invention. As shown in FIG. 1, a multi-resolution digital table display system mainly includes a table 5, a peripheral projection device 14, a foveal projection device 10, an image module 22 (as shown in FIG. 2). The table 5 includes a plurality of legs 5b, and a projection screen 5a supported by the legs 5b. The projection screen 5a is adapted for displaying image pictures thereon.

According to an embodiment of the present invention, the peripheral projection device 14 projects a peripheral image with a first resolution, and the foveal projection device 10 projects a foveal image with a second resolution, and in such a way an image picture with multi-resolution is projected by the two projection devices 14, 10 and displayed on the projection screen 5a. According to an aspect of the embodiment, the first resolution is a low resolution, and the second resolution is a high resolution. In order to save space, the peripheral projection device 14 and the foveal projection device 10 are accommodated in an accommodation space under the table 5.

Referring to FIG. 2, there is shown a schematic diagram illustrating a stitching of the peripheral image and the foveal image to obtain the multi-resolution image in accordance with the present invention. As shown in FIG. 2, when stitching the peripheral image of the low resolution and the foveal image of the high resolution, the image module 22 provides a pre-processed peripheral image 30 with the first resolution to the peripheral projection device 14 for projecting the same to the projection screen 5a, and at the same time the image module 22 also provides a pre-processed foveal image 31 with the second resolution to the foveal projection device 10 for projecting the same to the projection screen 5a. As the pre-processed peripheral image 30 and the pre-processed foveal image 31 are simultaneously displayed on the projection screen 5a, an integral image is thus displayed thereon.

According to an aspect of the embodiment, the pre-processed peripheral image 30 includes a low resolution image and at least a reserved area 30a (represented by the shadow) having no pixel data displayed thereby. Correspondingly, the pre-processed foveal image 31 includes a central area 31a corresponding to the reserved area 30a of the peripheral image 30. According to the pre-processed foveal image 31, only the central area 31a including pixel data. In other words, the foveal image 31 is displayed in the reserved area 30a of the peripheral image 30 at the projection screen 5a only.

Figure 3A:
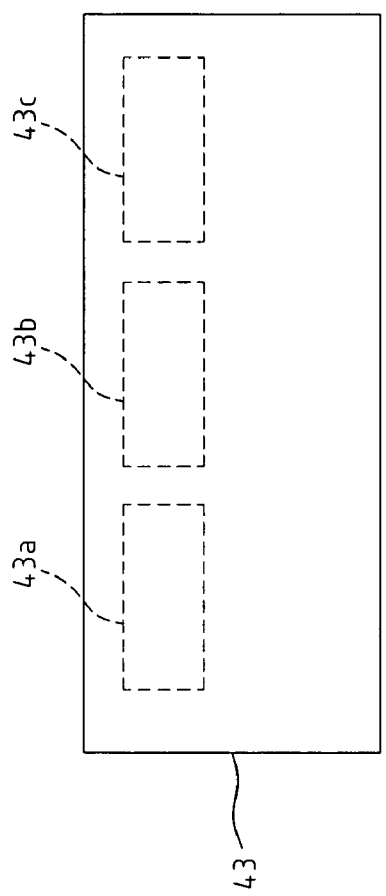
FIGS. 3A and 3B are schematic diagrams respectively illustrating operation modes of the present invention.
Figure 3B:
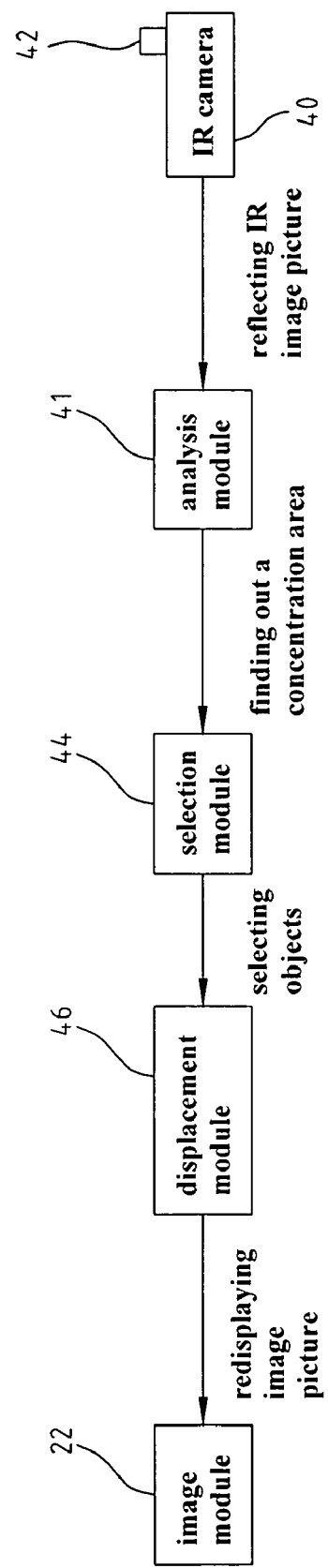

Referring to FIGS. 3A and 3B, there are shown schematic diagrams respectively illustrating operation modes of the present invention. As shown in FIG. 3A, an image picture 43 displayed thereby includes a plurality of objects 43a, 43b, 43c defined therein, each of which is defined with coordinates included in a coordinate system of the image picture 43. As shown in FIG. 3B, for conveniently operating the objects 43a, 43b, 43c, the multi-resolution digital table display system in accordance with the present invention further includes an infrared ray (IR) source 42, an IR camera 40, an analysis module 41, a selection module 44, and a displacement module 46.

In order to detect an operation condition of the user, when the IR source 42 projects an IR beam to the projection screen 5a and the IR camera 40 shoots towards the projection screen 5a, a reflecting IR image picture can be captured.

Meanwhile, if the user shelters an area of the image picture 43 corresponding to for example the object 43b with a pen or his palm, that means he has selected the object 43b for further operation. In detecting the selection of the object 43b, the analysis module 41 analyzes the captured reflecting IR image picture and finds out a concentration area of the reflecting IR image picture. In such a way, when the concentration area to some degree overlaps the coordinates of the object 43b, the selection module 44 defines the objects 43b as selected. Then, when the user moves the pen or his palm to another position, the motion is detected by the displacement module 46. The displacement module 46 redisplays an image picture corresponding to the selected object 43b according to displacement data about the detected motion of the concentration area. The displacement module 46 then transmits the redisplayed image picture corresponding to the selected object 43b to the image module 22 for further operation.

Figure 4:
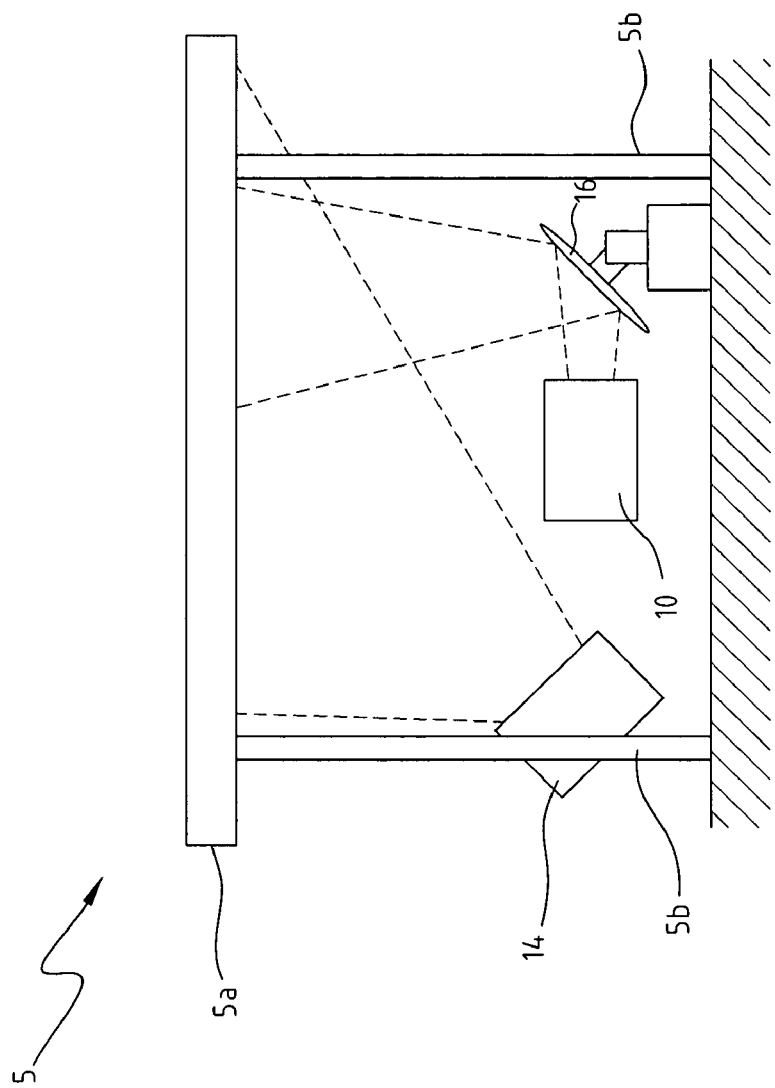
FIG. 4 is a schematic diagram illustrating a multi-resolution digital table display system in accordance with another embodiment of the present invention.

Referring to FIG. 4, there is shown a schematic diagram illustrating a multi-resolution digital table display system in accordance with another embodiment of the present invention. For moving a projection position of the foveal image 31, the multi-resolution digital table display system further comprises an adjustable reflective mirror 16 for reflecting the foveal image 31 projected from the foveal projection device 10 to the projection screen 5a. The adjustable reflective mirror 16 is mounted to a pan-tilt-unit which is connected to a computer, such that an angle of the adjustable reflective mirror 16 can be adjusted by the control of the computer. Accordingly, the projection position of the foveal image 31 can be conveniently changed by using the computer to control the rotational angle of the adjustable reflector mirror 16.

Figure 5:
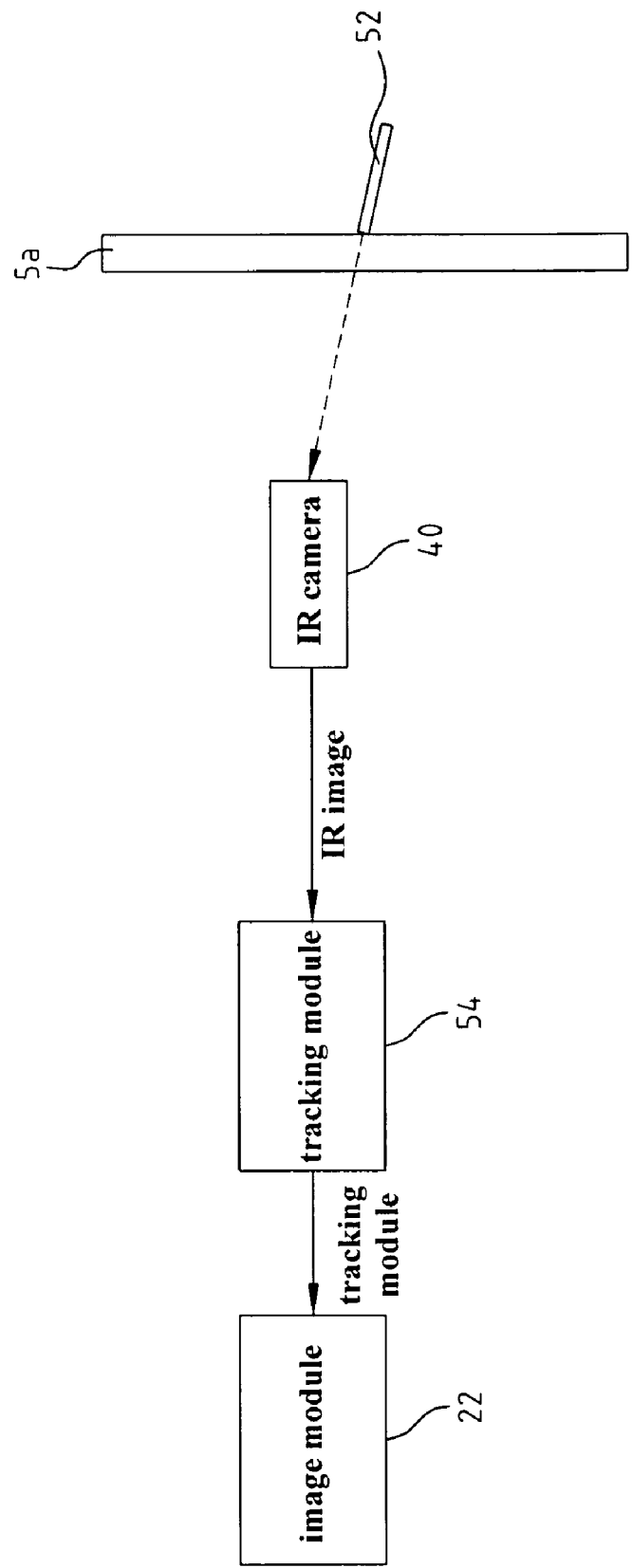
FIG. 5 is a schematic diagram illustrating a digital writing operation in accordance with the present invention.

Referring to FIG. 5, there is shown a schematic diagram illustrating a digital writing operation in accordance with the present invention. As shown in FIG. 5, in order to detect the writing operation of the user, the present invention further includes an IR pen 52 and a tracking module 54.

When the user holds the IR pen 52 in his hand, and writes on the projection screen 5a with the IR pen 52, the IR pen 52 actually synchronously projects an IR beam toward the projection screen 5a. At the same time, the IR camera 40 shoots towards the projection screen 5a. In such a way, the IR camera 40 receives the IR beam projected from the IR pen 52, so as to obtain an IR image. The IR image is then transmitted to the tracking module 54. The tracking module 54 generates a tracking pattern, such as, ○ or ×, according to the displacement data, and transmits the same to the image module 22. The image module 22 then displays the tracking pattern onto the image picture in addition.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A multi-resolution digital table display system, adapted for integrally displaying an image picture with multiple resolutions, comprising:
   a table, comprising:
      a plurality of legs; and
      a projection screen supported by the legs,
      wherein the legs and the projection screen together define an accommodation space under the table;
   a peripheral projection device, accommodated in the accommodation space, and being adapted for projecting a pre-processed peripheral image with a first resolution at a projection screen, wherein the pre-processed peripheral image comprises at least a reserved area having no pixel data displayed thereby;
   a foveal projection device, accommodated in the accommodation space, and being adapted for projecting a pre-processed foveal image with a second resolution at the projection screen, wherein the foveal image is displayed in the reserved area of the peripheral image at the projection screen only, and the first resolution is lower than the second resolution; and
   an image module, adapted for providing the pre-processed peripheral image to the peripheral projection device for displaying the same with the first resolution at the projection screen, and providing the pre-processed foveal image to the foveal projection device for displaying the same with the second resolution at the projection screen;
   wherein the image picture comprises a plurality of objects defined therein, and each of the objects is defined with coordinates included in a coordinate system of the image picture, the multi-resolution digital table display system further comprising:
      an infrared ray (IR) source, projecting an IR beam to the projection screen;
      an IR camera, shooting towards the projection screen for capturing a reflecting IR image picture;
      an analysis module, analyzing the captured reflecting IR image picture and finding out a concentration area of the reflecting IR image picture;

a selection module, for defining the object as selected when the concentration area to some degree overlaps the coordinates of the object to some degree; and a displacement module, for redisplaying the image picture corresponding to the selected object according to displacement data about a detected motion of the concentration area.

2. The multi-resolution digital table display system according to claim 1, further comprising an adjustable reflective mirror, accommodated in the accommodation space, and being adapted for adjustably reflecting the pre-processed foveal image projected from the foveal projection device to the projection screen.

3. The multi-resolution digital table display system according to claim 1, further comprising:

an IR pen, adapted to be held by a hand of a user, projecting an IR beam to the projection screen;

an IR camera, shooting towards the projection screen, and obtaining an IR image; and a tracking module, adapted to generate a tracking pattern according to displacement data of the IR image and transmit the same to the image module, so as to allow the tracking pattern to be displayed on the projection screen in addition to the image picture-in addition.

* * * * *